W. AND M. H. PATERSON.
MOTOR TRUCK TRACTOR.
APPLICATION FILED MAR. 4, 1919.
1,336,653. Patented Apr. 13, 1920.
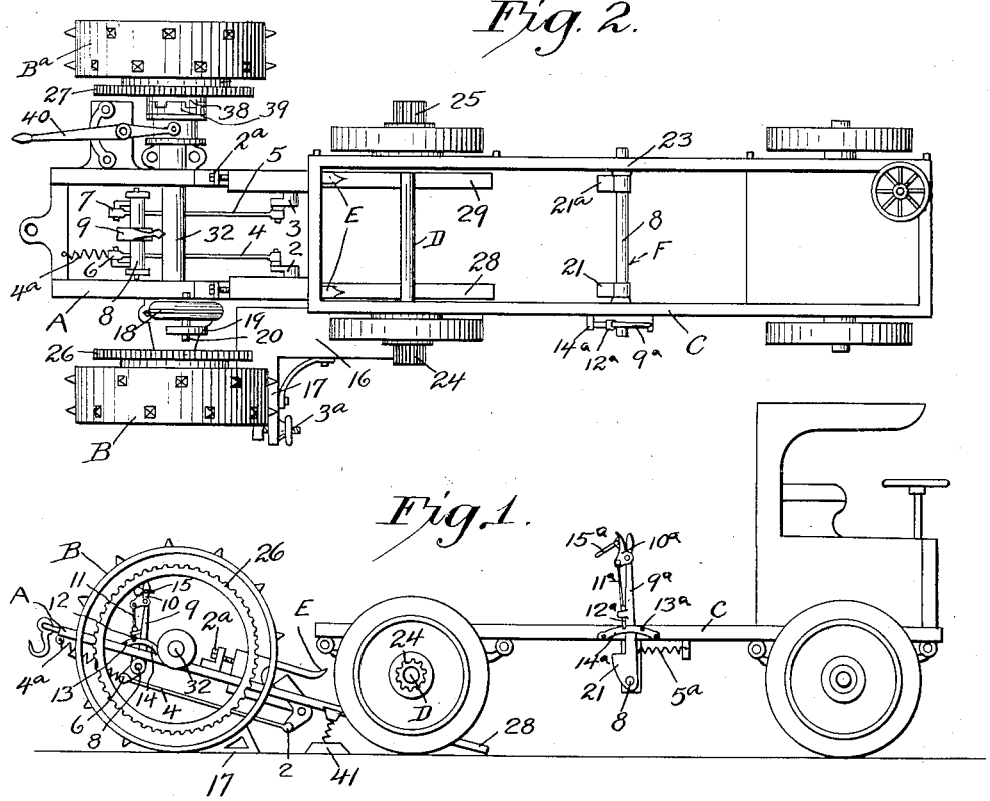
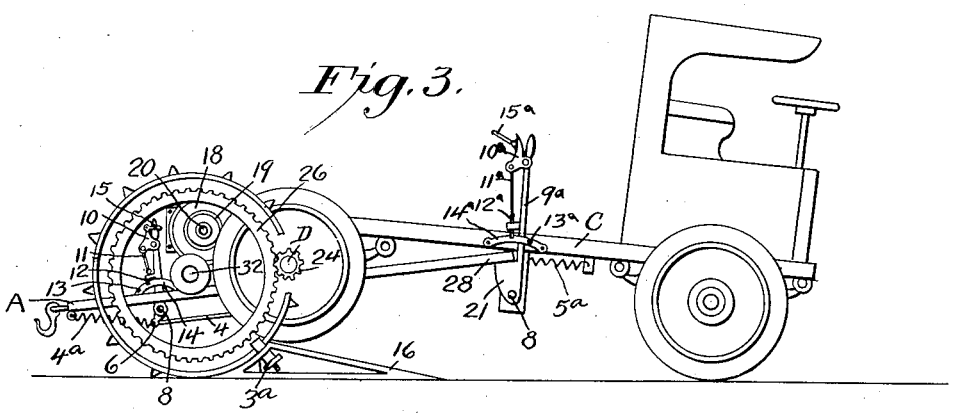
Inventors
William Paterson
May H. Paterson

UNITED STATES PATENT OFFICE.

WILLIAM PATERSON AND MAY H. PATERSON, OF OAKLAND, CALIFORNIA.

MOTOR-TRUCK TRACTOR.

1,336,653.

Specification of Letters Patent. Patented Apr. 13, 1920.

Application filed March 4, 1919. Serial No. 280,681.

*To all whom it may concern:*

Be it known that we, WILLIAM PATERSON and MAY H. PATERSON, citizens of the United States, residing at Oakland, in the county of Alameda and State of California, have invented a new and useful Motor-Truck Tractor, of which the following is a full, clear, and exact description, reference being had to the accompanying drawings, forming part of this specification, in which—

Figure 1. is an elevation of the tractor with a truck in position to be attached. Fig. 2. is a plan view of the same. Fig. 3. is an elevation of the tractor and truck attached.

Our invention relates to improvements in tractor attachments for motor trucks.

The objects of our invention are to furnish an easily attached and detachable tractor for a motor truck, to make it possible for one man to attach the truck to a tractor without his leaving the driver's seat. A further object is to enable a motor truck to leave the highway and go into a field, and do all the hauling that a tractor, or a team of the same horse power could do. It is well known that a motor truck cannot economically leave the road, and that a tractor cannot leave the field and make ten or fifteen miles per hour on the highway; this we propose to do without impairing the truck, or losing time. A further object is to lock the differential, when the truck is attached to the tractor through the medium of the clutch upon the tractor axle, when necessary. This we accomplish by the mechanism shown in the drawing and following description.

In the drawing similar letters or numerals refer to similar parts throughout the several views. "A" represents the tractor chassis, supported by tractor wheels, "B B$^a$"; the motor truck "C", having the axle "D", and rocking shaft "F"; the yokes "E E" are mounted upon the upper side of the forward extending arms of the chassis "A"; the pawls 2 and 3 are of rectangular shape, and are pivoted at their base to the lower side of the yokes "E E"; the upper ends of the pawls, 2 and 3 close the yokes "E E", forming a stopper to the truck axle "D"; the yokes E E are slidably adjustable upon the chassis A, by means of nut on threaded stud projecting through the bracket 2$^a$; the lower ends of pawls 2 and 3, are connected by connecting rods 4 and 5, to the lower ends of depending arms 6 and 7; a tension spiral spring 4$^a$ is attached to lower end of arm 6 at one of its ends, the other end is fixed to tractor chassis "A"; the upper ends of arms 6 and 7 are fixed to rocking shaft 8 journaled underneath the tractor chassis "A"; a lever 9, is fixed to rocking shaft 8; a bell crank handle 10, is pivoted near its top connected by connecting rod 11; a vertically sliding bolt 12, is adapted to fit into a notch 13, on quadrant 14; a clasp 15, is loosely pivoted to upper end of bell crank handle 10, adapted to slide over top of said lever 9, thus preventing said bolt 12, from entering said notch 13, in said quadrant 14. A lever 9$^a$ is fixed to rocking shaft F, journaled underneath the chassis of the motor truck C. A bell crank handle 10$^a$ is pivoted near its top connected by connecting rod 11$^a$ a vertically sliding bolt 12$^a$ is adapted to fit into a notch 13$^a$ on quadrant 14$^a$, a clasp 15$^a$ is loosely pivoted to upper end of bell crank handle 10$^a$ adapted to slide over top of said lever 9$^a$ thus preventing said bolt 12$^a$ from entering said notch 13$^a$ in said quadrant 14$^a$.

A combination portable rail 16, and tractor wheel block 17, serves the purpose of holding the tractor rigid when attaching a motor truck to the tractor chassis. A fan blower 18, is mounted upon tractor chassis "A" having a friction pulley 19, mounted upon the fan spindle 20; said friction pulley 19 abuts on the face of one of the driving wheels of the truck "C", when the truck "C" is in positive connection with the tractor chassis "A". The latches 21 and 21$^a$ are fixed to rocking shaft F, journaled at a point 23, underneath the chassis of the truck "C", the axle "D" on the truck "C", being housed in the yokes "E E", the pinions 24 and 25, being in mesh with the spur gears 26 and 27, power being applied in the right direction, the pinions 24 and 25 will travel upward, upon the spur gears 26 and 27, thus raising the forward extension of the tractor chassis 28 and 29, until said chassis 28 and 29, impinges upon the spring actuated latches 21 and 21$^a$ causing them to recede, and then spring back in latches 21 and 21$^a$ thus completing the attachment of the truck chassis "C", to the tractor chassis "A".

The tractor wheel B, having the spur gear 26 attached, is keyed to one end of axle 32; the tractor wheel "B$^a$", having the spur gear 27 attached, turns loosely upon the other end of the axle 32, and is equipped with a clutch jaw 38 upon one end of its hub, a corresponding clutch jaw 39, moving laterally upon a feathering key, is slidably mounted upon the axle 32; a forked lever 40, suitably mounted, is capable of moving the clutch 39 in or out of gear, and when in gear, will lock the differential, when the motor truck "C", is attached to the tractor chassis "A", a spring support 41, forms an adjustable rest for the forward end of the tractor chassis.

What we claim as new and desire to secure by Letters Patent is:

1. In a motor truck tractor the combination of a chassis supporting in part a motor truck, tractor wheels carried by the chassis, yokes slidably mounted upon the tractor chassis, adapted to receive the axle of a motor truck, and spring actuated pawls that lock the motor truck axle within said yokes.

2. In a motor truck tractor, the combination of a tractor chassis supporting the rear end of a motor truck, a live axle journaled upon the chassis, tractor wheels mounted on the tractor axle, adjustable yokes mounted upon the chassis adapted to receive the axle of a motor truck, spring actuated pawls pivoted upon the adjustable yokes, a lever connected to said pawls, to render the pawls positive and to disengage the pawls.

3. In a motor truck tractor, the combination of a chassis supporting in part the motor truck, tractor wheels having spur gears attached carried by the chassis, adjustable yokes mounted upon the chassis, pawls to secure the truck axle within the yokes, pinions mounted upon the hubs of truck driving wheels, in alinement and in mesh with spur gears mounted upon the traction wheels of the tractor.

4. In a motor truck tractor, the combination of a chassis supporting in part a motor truck, tractor wheels having spur gears attached carried by the chassis, adjustable yokes slidably mounted upon the chassis, pawls to secure the truck axle within the yokes, a lever, a bell crank handle pivoted near the top of said lever, a clasp loosely pivoted to upper end of said bell crank handle adapted to slide over the top of said lever.

5. In a motor truck tractor, the combination of a chassis supporting the rear end of a motor truck, tractor wheels carried by the chassis, adjustable yokes to house a motor truck axle, pawls to secure the truck axle within the yokes, a rocking shaft having spring actuated latches attached, journaled underneath the motor truck chassis, adapted to receive and latch the forward ends of the tractor chassis.

6. In a truck tractor the combination of a chassis supporting in part a motor truck, tractor wheels having spur gears attached, carried by the tractor chassis, adjustable yokes mounted on the chassis adapted to receive a truck axle, a combined rail and tractor wheel block, adapted to be clamped to the tire of the tractor wheels near their base.

7. In a truck tractor the combination of a chassis supporting the rear end of a motor truck, a live axle journaled upon the tractor chassis, tractor wheels mounted on the tractor axle supporting the tractor chassis, one of said tractor wheels being keyed to one end of said axle the other tractor wheel turning loosely upon the other end of said axle and being provided with clutch jaws cast on one side of its hub, a corresponding clutch jaw slidably mounted upon said axle.

8. In a motor truck tractor, the combination of a chassis supporting in part a motor truck, tractor wheels having spur gears attached, carried by the chassis, adjustable yokes mounted upon the chassis, pawls to secure the truck axle within the yokes, a fan blower mounted upon the tractor chassis, a friction pulley mounted upon the fan spindle, abutting on the face of a driving wheel of the truck.

WILLIAM PATERSON.
MAY H. PATERSON.

Witnesses:
E. H. HOLBROOK,
MOLLIE E. HOLBROOK.